(12) United States Patent
Baba et al.

(10) Patent No.: US 6,668,489 B2
(45) Date of Patent: Dec. 30, 2003

(54) SOUND INSULATING WEATHER STRIP

(75) Inventors: Eiichi Baba, Hiroshima-ken (JP); Yoshihiro Kohara, Hiroshima-ken (JP)

(73) Assignee: Nishikawa Rubber Co., Ltd., Hiroshima-ken (JP)

( * ) Notice: Subject to any disclaimer, the term of this patent is extended or adjusted under 35 U.S.C. 154(b) by 225 days.

(21) Appl. No.: 09/810,222

(22) Filed: Mar. 19, 2001

(65) Prior Publication Data

US 2002/0129558 A1 Sep. 19, 2002

(51) Int. Cl.[7] .................................................. E06B 7/22
(52) U.S. Cl. ........................................................ 49/498.1
(58) Field of Search .............................. 49/475.1, 479.1, 49/489.1, 498.1

(56) References Cited

U.S. PATENT DOCUMENTS

| | | | | |
|---|---|---|---|---|
| 3,159,886 A | * | 12/1964 | Lynch ......................... 49/498.1 |
| 4,702,039 A | * | 10/1987 | Bocchinfuso ............... 49/490.1 |
| 4,919,471 A | * | 4/1990 | Seino et al. ................ 49/498.1 |
| 5,511,343 A | * | 4/1996 | Guillon ....................... 49/479.1 |
| 5,586,772 A | * | 12/1996 | Deaver ....................... 49/498.1 |
| 5,693,419 A | | 12/1997 | Nozaki ........................ 428/354 |
| 5,852,898 A | * | 12/1998 | Hikosaka et al. ........... 49/498.1 |
| 5,970,659 A | * | 10/1999 | Oord ............................ 49/377 |
| 6,119,404 A | * | 9/2000 | Bschorr et al. ............. 49/498.1 |
| 6,158,171 A | * | 12/2000 | Kellogg et al. ............. 49/489.1 |
| 6,266,925 B1 | * | 7/2001 | Camerer ..................... 49/475.1 |

* cited by examiner

Primary Examiner—Jerry Redman
(74) Attorney, Agent, or Firm—Sughrue Mion, PLLC

(57) ABSTRACT

A sound insulating weather strip for automobile comprising: a hollow seal portion to be attached to at least one of a door and a body panel of a car; and a low density foam sponge material comprising a rubber or synthetic resin, and provided at a portion in said hollow seal portion which is to be held and compressed between said door or a glass and said body panel when said door is closed.

3 Claims, 9 Drawing Sheets

SOUND INSULATING WEATHER STRIP

FIELD OF THE INVENTION

The present invention relates to a weather strip which is high sound-insulating effect and which is attached to a car.

BACKGROUND ART OF THE INVENTION

Figure 1:
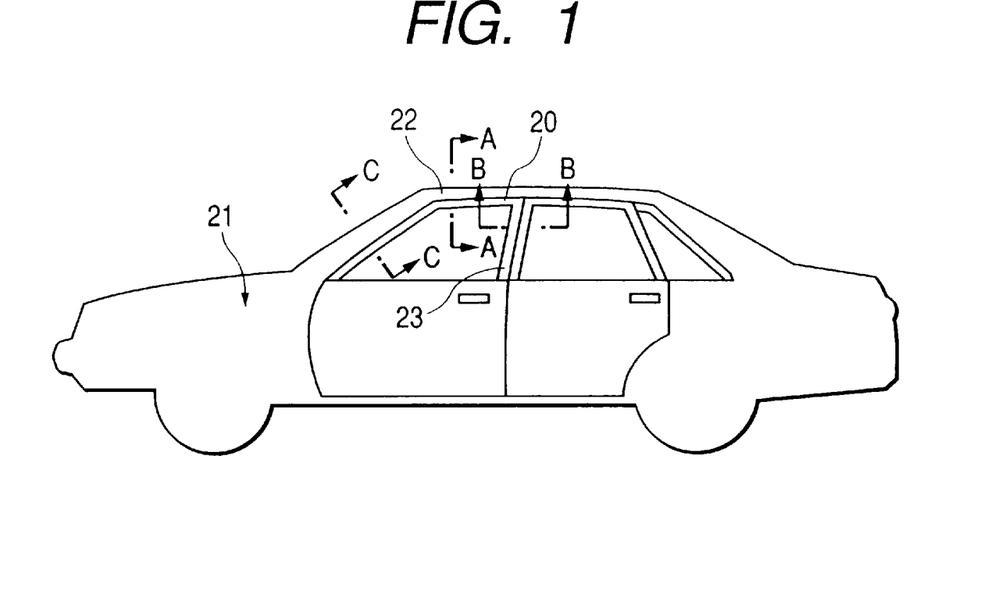
FIG. 1 is a side view showing a car to which a weather strip is attached.
Figure 2:
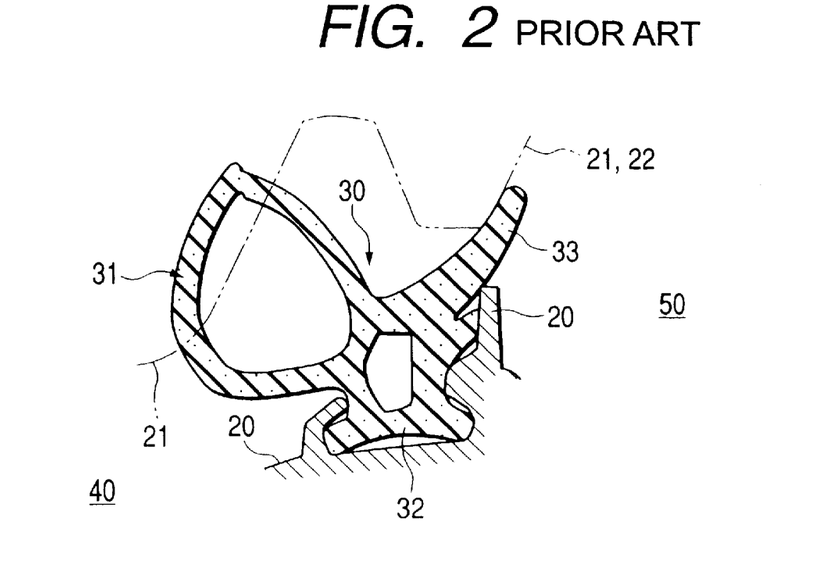
FIG. 2 is a sectional view taken on line A—A in FIG. 1, showing a background-art example.
Figure 3:
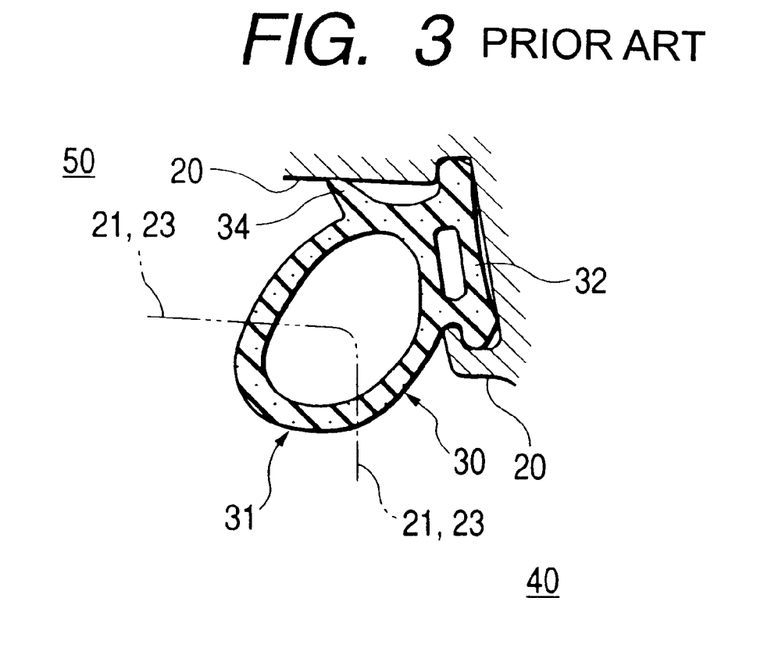
FIG. 3 is a sectional view taken on line B—B in FIG. 1, showing a background-art example.

Description will be made with reference to FIGS. 1 to 3. In a weather strips 30 according to the background art to be attached to a door sash 20 of a car, a member to be attached on a roof 22 side is constituted by a base portion 32, a hollow seal portion 31 and a lip portion 33 as shown in FIG. 2. The base portion 32 is a portion to be fitted to the door sash 20. The hollow seal portion 31 and the lip portion 33 are brought into elastic contact with a body panel 21 so as to exhibit sealing properties. On the other hand, one of the weather strips to be attached on a center pillar 23 side is constituted by a base portion 32, a hollow seal portion 31 and a small lip portion 34 as shown in FIG. 3. The small lip portion 34 is brought into elastic contact with the door sash 20.

In the weather strips 30 configured thus, particularly the hollow seal portion 31 is required to have a sound insulating function for blocking the entrance of external sound, as well as a waterproof function for blocking the entrance of water such as rainwater, car-washing water, etc.

However, the hollow seal portion 31 in the background-art weather strips 30 cannot be considered to have a satisfactory sound insulating function. Therefore, there is a problem that external noise is apt to enter the cabin even when the window glass has been shut up.

Examples of other weather strips include an opening whether strip, a drip weather strip, a trunk weather strip, a hard top weather strip, etc., and such weather strips are attached to a body flange, a sash, a retainer, or the like, of a car. In each of the weather strips, a hollow seal portion is brought into elastic contact with a door, a glass, or a body, so as to exhibit sealing properties. Thus, these weather strips are also required to have a function of blocking the entrance of external sound.

SUMMARY OF THE INVENTION

The present invention has been made to solve the above-described problem.

Accordingly, an object of the present invention is to provide a sound insulating weather strip having satisfactory sound-insulating function so as to prevent external noise from easily entering into the cabin.

Other objects and effects of the present invention will become apparent from the following description.

With reference to FIG. 1 and FIGS. 4 to 19, the above-described objects of the invention have been achieved by providing the following sound insulating weather strips.

According to a first aspect of the present invention, the sound insulating weather strip comprises: a hollow seal portion 11 to be attached to at least one of a door sash 20 or glass 20a and a body panel 21 of a car; and a low density foam sponge material 17 comprising a rubber or synthetic resin, and provided at a portion in the hollow seal portion 11 which is to be held and compressed between the door sash 20 or a glass 20a and the body panel 21 when the door is closed.

In a second aspect of the invention, the low density foam sponge material 17 according to the first aspect of the invention has a specific gravity smaller than that of the hollow seal portion 11.

In a third aspect of the present invention, the low density foam sponge material 17 according to the first or second aspect of the invention has a specific gravity of from 0.1 to 0.3.

In a fourth aspect of the present invention, the low density foam sponge material 17 according to the first, second or third aspect of the invention is extrusion-molded integrally with the hollow seal portion.

PREFERRED EMBODIMENTS OF THE INVENTION

Figure 4:
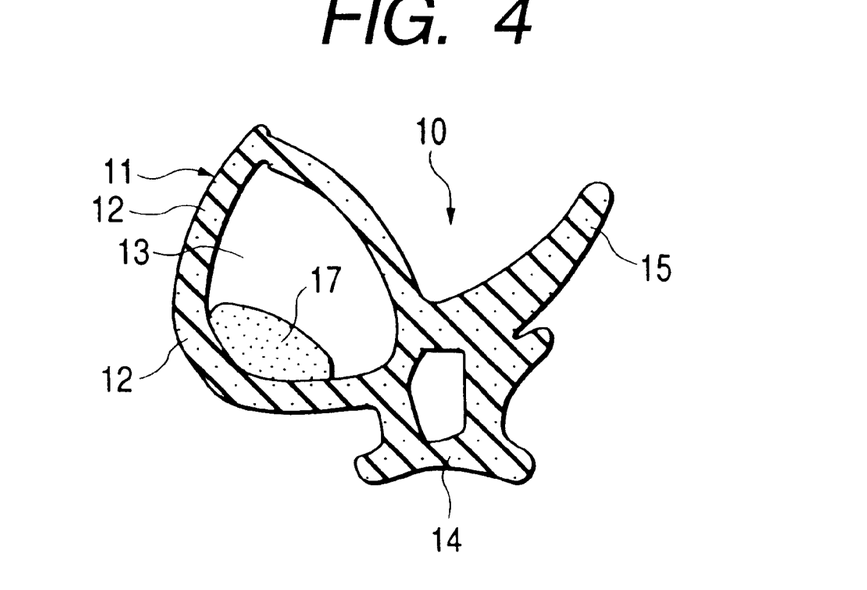
FIG. 4 is a sectional view taken on line A—A in FIG. 1, showing a first embodiment of a weather strip according to the present invention.
Figure 5:
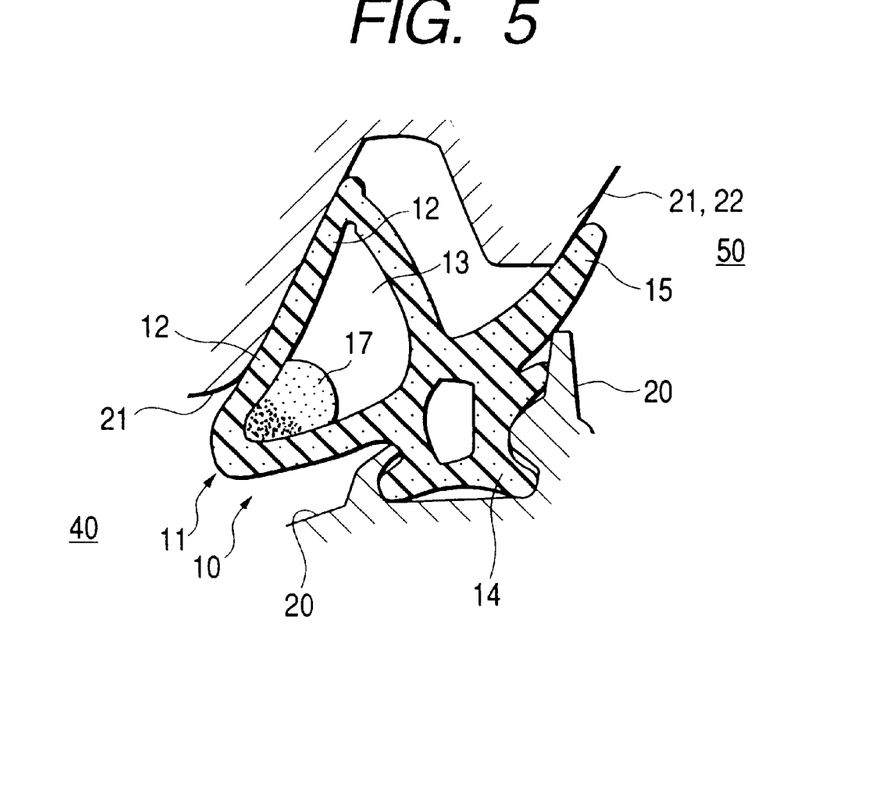
FIG. 5 is a sectional view showing the state of the weather strip according to the present invention when a door has been closed.

A first embodiment of the sound insulating weather strip 10 according to the present invention will be described with reference to FIG. 1 and FIGS. 4 and 5. The weather strip 10 is attached to a door sash 20 on a roof 22 side. The sound insulating weather strip 10 is constituted chiefly by a base portion 14, a hollow seal portion 11 and a lip portion 15. A low density foam sponge material 17 is further provided in a hollow portion 13 of the hollow seal portion 11. The hollow portion 13 is located in a lower end portion of a car interior side (hereinafter referred to as "interior" simply) 40. The hollow portion 13 includes a portion which will be held and strongly compressed between the door sash 20 and a body panel 21 when the door is closed. The low density foam sponge material 17 is made of synthetic rubber, and has specific gravity about in a range of from 0.1 to 0.3.

The low density foam sponge material 17 is uniform in density at the time of extrusion molding. However, once the foam sponge material is held and compressed between the door sash 20 and the body panel 21, a portion of the foam sponge material on the interior 40 side becomes high in density (fine in texture) due to a large compression quantity while a portion of the same on a car exterior side (hereinafter referred to as "exterior" simply) 50 becomes low in density (rough in texture) due to a small compression quantity. Incidentally, the low density foam sponge material 17 is formed integrally with the hollow seal portion 11 by co-extrusion molding.

Figure 6:
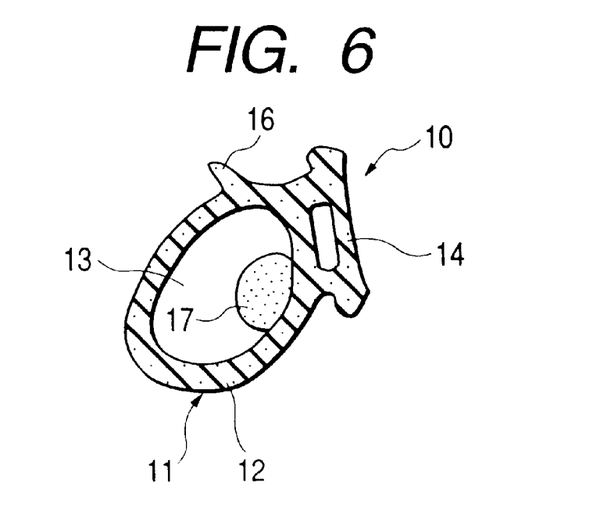
FIG. 6 is a sectional view taken on line B—B in FIG. 1, showing a second embodiment of a weather strip according to the present invention.
Figure 7:
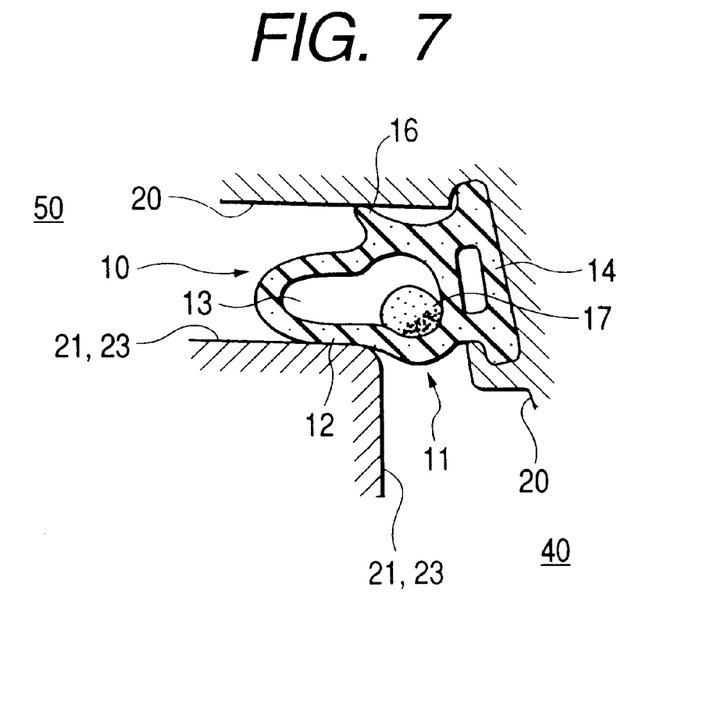
FIG. 7 is a sectional view showing the state of the weather strip according to the present invention when a door has been closed.

A second embodiment of the weather strip 10 according to the present invention will be described with reference to FIGS. 1, 6 and 7. The sound insulating weather strip 10 is attached to a door sash 20 on a center pillar 23 side. The weather strip 10 is constituted by a hollow seal portion 11 and a small lip portion 16. A low density foam sponge material 17 made of synthetic rubber is provided in a hollow portion 13. The hollow portion 13 is located in a portion which will be held and compressed between the door sash 20 and a body panel 21 when the door is closed.

Figure 8:
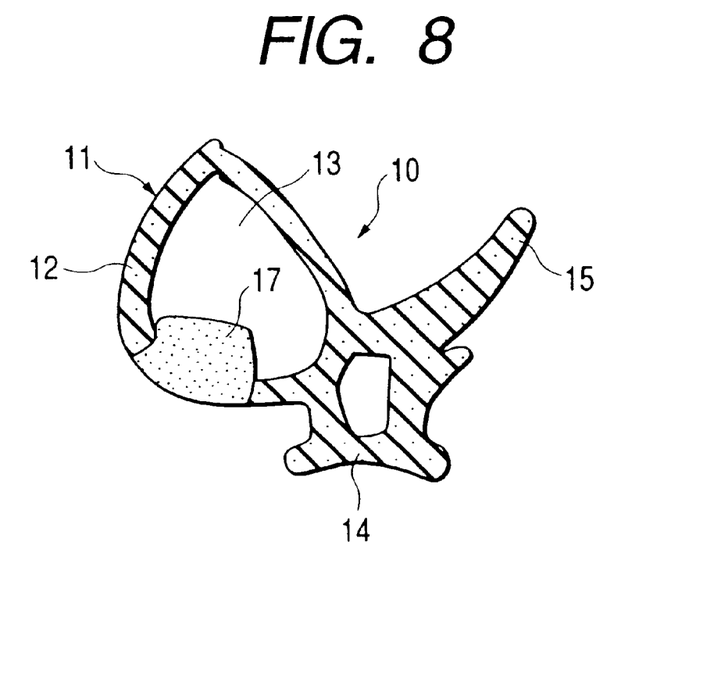
FIG. 8 is a sectional view taken on line A—A in FIG. 1, showing a third embodiment of a weather strip according to the present invention.

A third embodiment of the weather strip 10 according to the present invention will be described with reference to FIGS. 1 and 8. The sound insulating weather strip 10 is attached to a door sash 20 on a roof 22 side. In the first and second embodiments, the low density foam sponge material 17 was provided in the hollow portion 13. The weather strip 10 in this third embodiment has a feature that the low density foam sponge material 17 is provided over the hollow portion 13 and a seal portion 12.

Incidentally, the shape of the low density foam sponge material 17 is not limited to a sectionally circular shape, but it may be set to be any other shape such as a quadrilateral shape, a lip-like shape, or the like.

Description will be made about the operations of the sound insulating weather strips 10 according to the first to third embodiments. In each of the weather strips 10, the low density foam sponge material 17 is provided in a portion which will be held and compressed between the door sash 20 and the body panel 21 when the door is closed. Thus, external sound can be surely prevented from entering the cabin. That is, when the door is closed, the low density foam sponge material 17 is held between the door sash 20 and the body panel 21 so as to be located to block a gap between the door sash 20 and the body panel 21. In addition, the low density foam sponge material 17 absorbs external sound, or reflects or scatters the sound to the outside. Thus, the external sound is prevented from entering the cabin.

In addition, the low density foam sponge material 17 is uniform in density at the time of extrusion molding. However, once the foam sponge material is held and compressed between the door sash 20 and the body panel 21, a portion thereof on the interior 40 becomes high in density due to a large compression quantity while a portion thereof on the exterior 50 becomes low in density due to a small compression quantity. Thus, chiefly, the portion on the exterior 50 can absorb sound while the portion on the interior 40 can reflect and scatter sound surely. As a result, the entrance of sound can be blocked surely by both of such a sound absorbing effect and such a sound reflecting/scattering effect. Generally, in the field of noise reduction technology, for ideal sound blocking, it is believed that the density of the sound insulating material 17 on the sound entrance side should be made lower while the density of the sound insulating material 17 on the sound reception side should be made higher. The present invention implements such an ideal of sound insulation.

Further, in each of the weather strips 10 according to the present invention, the sound insulating effect can be enhanced also by providing an air layer in the hollow portion 13 of the hollow seal portion 11. That is, it may be considered that the low density foam sponge material 17 is provided to fill the whole of the hollow portion 13. In this case, the thickness of the low density foam sponge material 17 is increased to enhance the sound insulating effect. However, the present inventors considered that the sound insulating effect would be higher if an air layer was provided between the low density foam sponge material 17 and the adjacent seal portion 12 (a seal portion on the body panel 21 side in FIG. 5) than if the thickness of the low density foam sponge material 17 was increased. Thus, the present inventors adopted the aforementioned structure. There is a similar idea also in the field of noise reduction technology.

Figure 9:
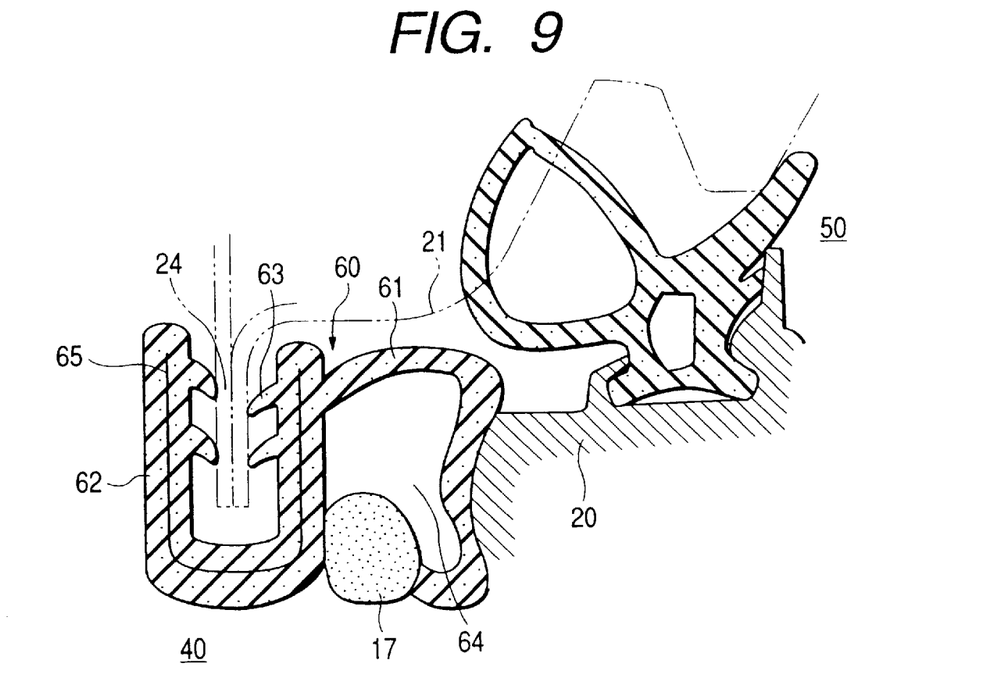
FIG. 9 is a sectional view taken on line C—C in FIG. 1, showing an embodiment of an opening weather strip according to the present invention.

Next, an embodiment of an opening weather strip 60 according to the present invention will be described with reference to FIGS. 1 and 9. The opening weather strip 60 is to be attached to a body flange 24 of a car. The opening weather strip 60 is constituted by a trim body 62 and a hollow seal portion 61. The trim body 62 has a metal core 65 and claw portions 63 for holding the body flange 24. The hollow seal portion 61 is molded integrally with the trim body 62. A low density foam sponge material 17 made of rubber or synthetic resin is further provided in a portion of the hollow seal portion 61 which will be held and compressed between the body panel 21 and the door sash 20 when the door is closed.

The specific gravity of the low density foam sponge material 17 is set to be about in a range of from 0.1 to 0.3, smaller than that of the hollow seal portion 61. In addition, the low density foam sponge material 17 is extrusion-molded integrally with the hollow seal portion.

Figure 10:
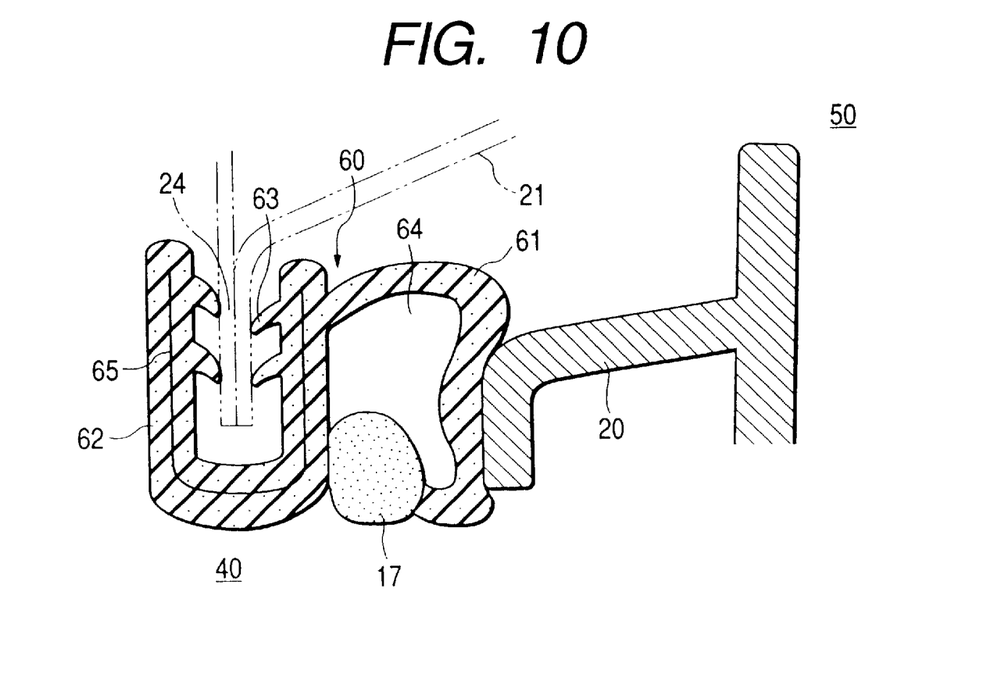
FIG. 10 is a sectional view showing another embodiment of an opening weather strip according to the present invention.

Incidentally, in this embodiment of the present invention, a weather strip 30 is attached to the door sash. However, the opening weather strip 60 is also applicable to a car in which no weather strip is attached to a door sash 20 as shown in FIG. 10.

In addition, though not shown, the opening weather strip 60 is also applicable to a car in which a seal material called "parting seal" is attached to a door sash 20, instead of the weather strip attached to the door sash 20, or applicable to a car in which a drip seal is attached to a body of the car, instead of the weather strip attached to the door sash 20.

Description will be made about the operation of the sound insulating opening weather strip 60 according to the embodiment in FIGS. 9 and 10. In the opening weather strip 60, the low density foam sponge material 17 is provided in a portion of the hollow seal portion 61 which will be held and compressed between the body panel 21 and the door sash 20 when the door is closed. Accordingly, external sound can be surely prevented from entering the cabin. That is, when the door is closed, the low density foam sponge material 17 is located to fill a gap between the body panel 21 and the door sash 20 in the same manner as the case in which the low density foam sponge material 17 is attached to the above-mentioned weather strip 10. As a result, the low density foam sponge material 17 absorbs external sound, or reflects or scatters the external sound to the outside. Thus, the external sound is prevented from entering the cabin.

Incidentally, in the same manner as the case in which the low density foam sponge material 17 is attached to the above-mentioned weather strips, the low density foam sponge material 17 in this embodiment is uniform in density at the time of extrusion molding. However, when the sponge material 17 is held and compressed between the body panel 21 and the door sash 20, a portion of the sponge material 17 on the interior 40 becomes high in density due to a large compression quantity while a portion thereof on the exterior 50 becomes low in density due to a small compression quantity. Thus, the entrance of sound can be blocked surely by both the sound absorbing effect and the sound reflecting/scattering effect.

Incidentally, also in the sound insulating opening weather strip 60 in this embodiment, an air layer is provided in a hollow portion 64 of the hollow seal portion 61 in the same manner as the case of the above-mentioned weather strips. Thus, the sound insulating effect is enhanced.

Figure 11:
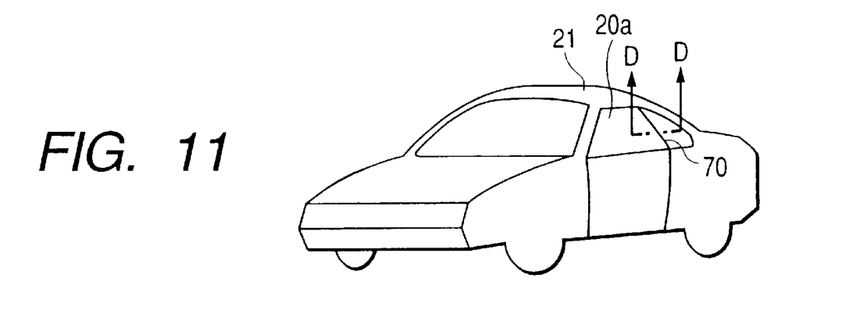
FIG. 11 is a perspective view of a hard top car.
Figure 12:
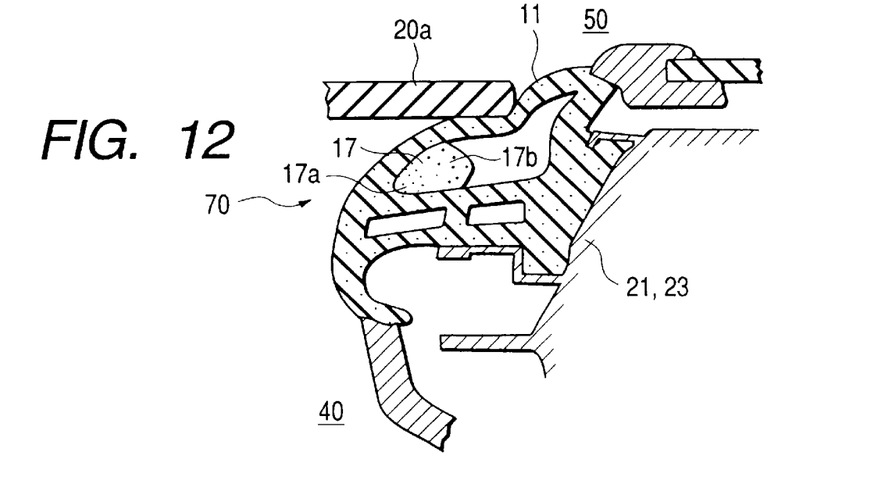
FIG. 12 is a sectional view taken on line D—D, showing an example of a hard top weather strip.
Figure 13:
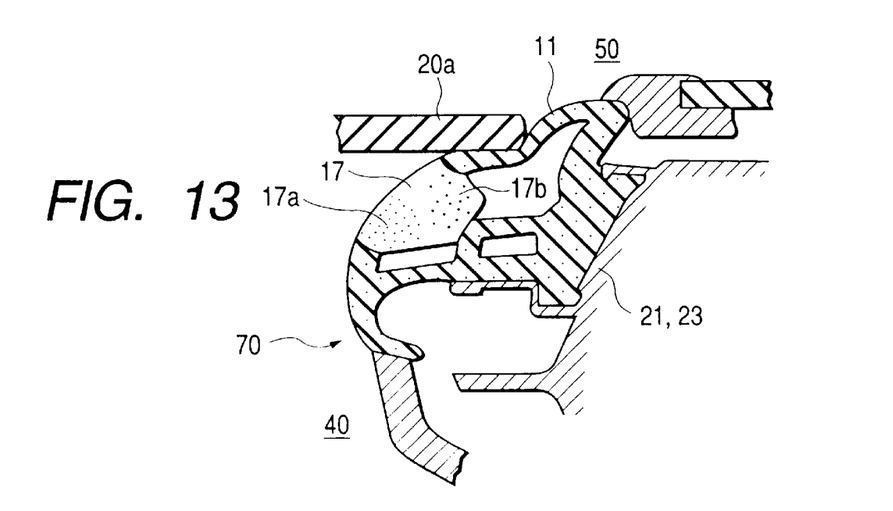
FIG. 13 is a sectional view taken on line D—D, showing another example of a hard top weather strip.

FIGS. 11 to 13 show a hard top weather strip 70. When a low density foam sponge material 17 in a hollow seal portion 11 is compressed by a glass 20a, a portion of the low density foam sponge material 17 on the interior 40 becomes a fine sponge portion 17a while a portion on the exterior 50 becomes a rough sponge portion 17b.

Figure 14:
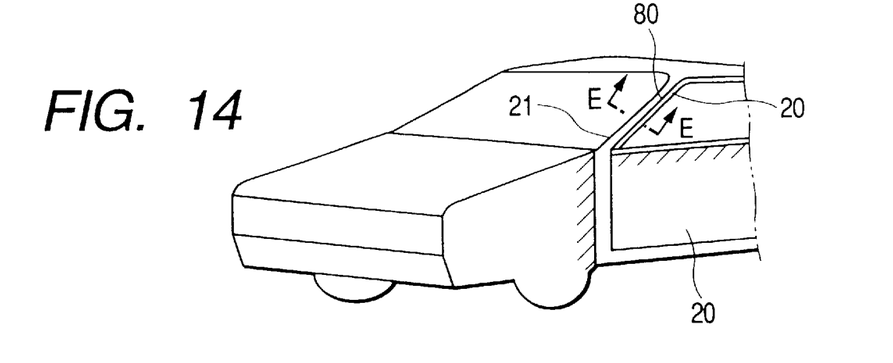
FIG. 14 is a partial perspective view of another car.
Figure 15:
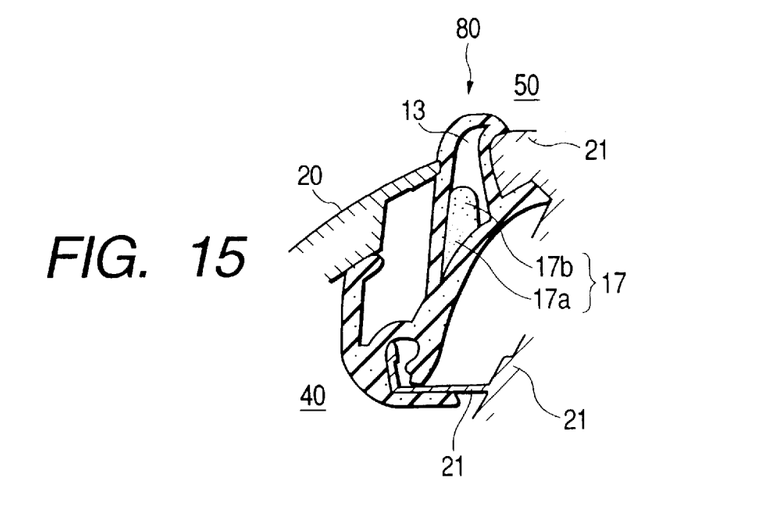
FIG. 15 is a sectional view taken on line E—E, showing an example of a drip weather strip.
Figure 16:
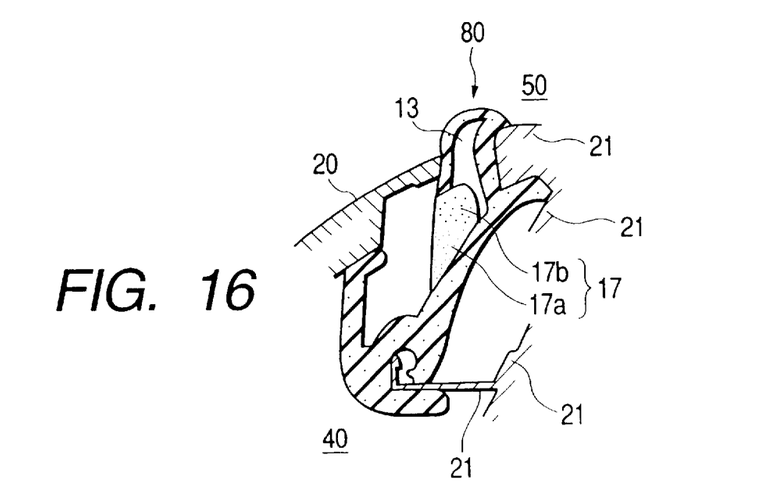
FIG. 16 is a sectional view taken on line E—E, showing another example of a drip weather strip.

FIGS. 14 to 16 show a drip weather strip 80. FIG. 15 shows the case where a low density foam sponge material 17 is disposed in a hollow portion 13. FIG. 16 shows the case where the low density sponge material 17 is provided so as to form a part of the circumferential wall of the hollow portion 13. When the low density sponge material 17 is compressed by the door sash 20, a portion of the sponge material on the interior 40 becomes a fine sponge portion 17a while a portion of the same sponge material on the exterior 50 becomes a rough sponge portion 17b.

Figure 17:
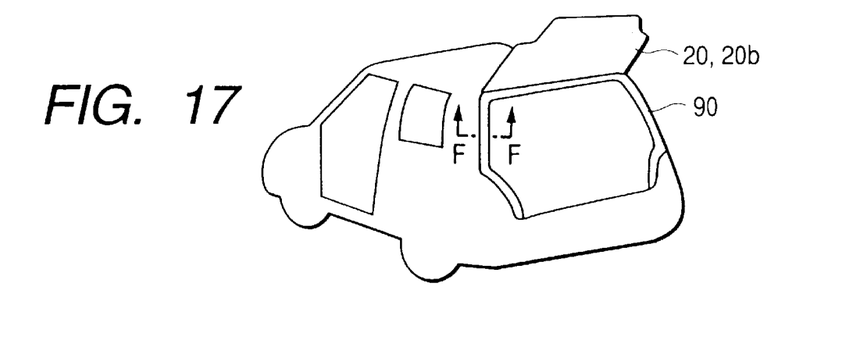
FIG. 17 is a perspective view of further another car viewed from its back.
Figure 18:
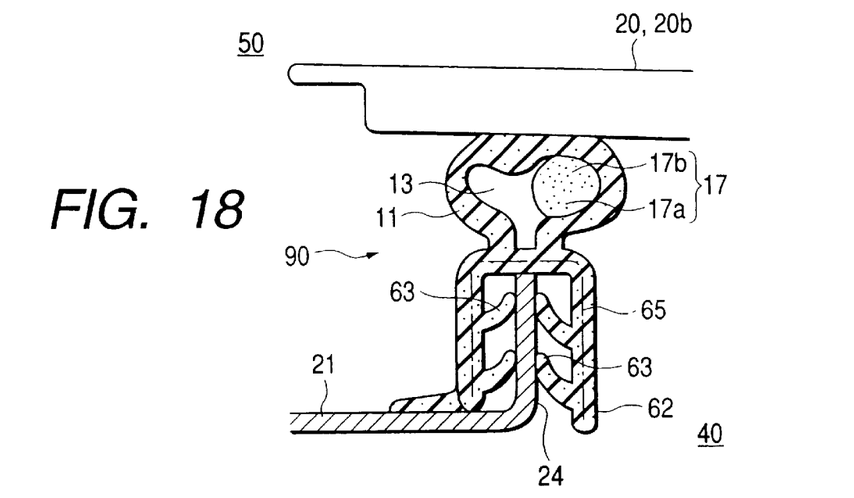
FIG. 18 is a sectional corresponding view taken on line F—F in FIG. 17, showing an example of a trunk weather strip in the condition that a trunk door in FIG. 17 has been closed.
Figure 19:
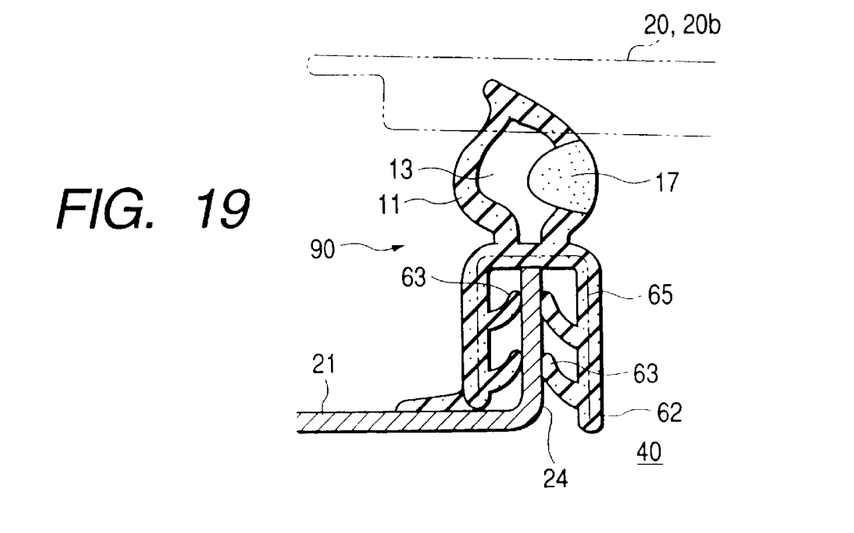
FIG. 19 is a sectional corresponding view taken on line F—F in FIG. 17, showing another example of a trunk weather strip.

FIGS. 17 to 19 shows a trunk weather strip 90. FIG. 18 shows the case where a low density foam sponge material 17 is disposed in a hollow portion 13. FIG. 19 shows the case where the low density sponge material 17 is provided so as to form a portion of the circumferential wall of the hollow portion 13. When the low density sponge material 17 is compressed by the door sash 20 or a door panel 20b, a portion of the sponge material on the interior 40 becomes a fine sponge portion 17a while a portion of the same sponge material on the exterior 50 becomes a rough sponge portion 17b.

EXAMPLES

Figure 20:
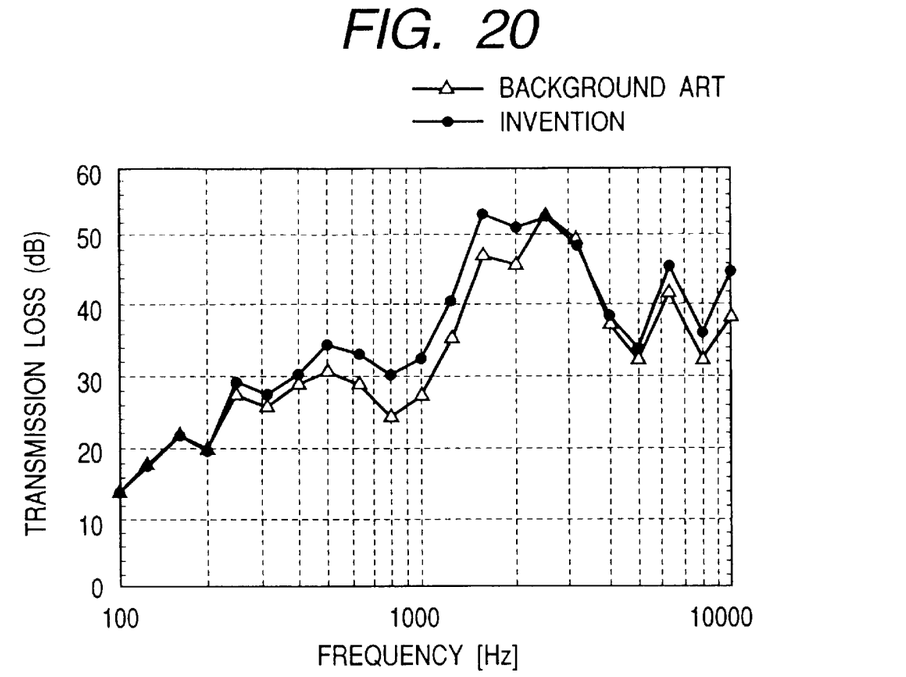
FIG. 20 is a graph showing, in comparison, the quantity of transmission loss in the present invention and that in the background-art example.
Figure 21:
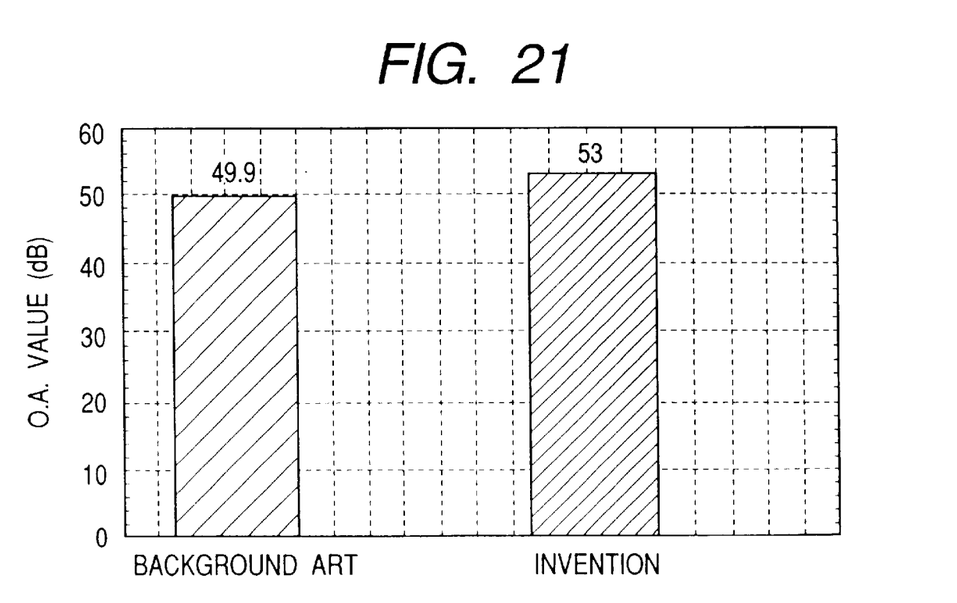
FIG. 21 is a graph showing, in comparison, an overall value in the present invention and that in the background-art example.

The present inventors carried out experiments to confirm the sound insulating effect of the sound insulating weather strip 10 according to the present invention. The results are shown in FIGS. 20 and 21. FIG. 20 is a graph showing a difference in the quantity of sound transmission loss between the sound insulating weather strip 10 according to the present invention (indicated by the symbol ●) and the background-art weather strip 10 (indicated by the symbol Δ). As shown in this graph, as to sound of any frequency, the quantity of sound transmission loss in the sound insulating weather strip 10 according to the present invention was larger than that in the background-art weather strip 10. That is, the sound insulating weather strip 10 according to the present invention was superior in sound insulating properties.

FIG. 21 shows overall values (O. A. values) of the weather strip 10 according to the present invention and the background-art weather strip 30 as to sound the frequency of which was in range of from 1 kHz to 2 kHz in the experiment of the quantity of sound transmission loss shown in FIG. 20. The weather strip 10 according to the present invention had a higher value. It is understood that it was superior in sound insulation.

In the first aspect of the invention, the low density foam sponge material 17 is provided in a portion which will be held and compressed between the door sash 20 and the body panel 21 when the door is closed. Thus, external sound can be surely prevented from entering the cabin.

In addition, in the weather strip 10 according to the first aspect of the invention, the low density foam sponge material 17 is uniform in density at the time of extrusion molding. However, when the sponge material is held and compressed between the door sash 20 and the body panel 21, a portion of the sponge material on the interior 40 becomes high in density due to a large compression quantity while a portion thereof on the exterior 50 becomes low in density due to a small compression quantity. Thus, the entrance of sound can be blocked surely by both the sound absorbing effect and the sound reflecting/scattering effect. Further, according to the present invention, an air layer is provided in the hollow portion 13 of the hollow seal portion 11. Thus, the sound insulating effect can be further enhanced.

According to the second aspect of the invention, in addition to the operation/effect of the first aspect of the invention, there is an operation/effect that the increase of the door closing force is suppressed.

According to the third aspect of the invention, in addition to the operation/effect of the second aspect of the invention, there is an operation/effect that the increase of the door closing force is further suppressed.

According to the fourth aspect of the invention, in addition to the operation/effect of the third aspect of the invention, there is an effect that the weather strip manufacturing cost is low (in comparison with the case where a separate body of low density foam sponge is integrated by adhesion or the like).

While the present invention has been described in detail and with reference to specific embodiments thereof, it will be apparent to one skilled in the art that various changes and modifications can be made therein without departing from the spirit and scope thereof.

What is claimed is:

1. A sound insulating weather strip for an automobile comprising:
   a hollow seal portion to be attached to at least one of a door and a body panel of a car; and
   a low density foam sponge material disposed entirely within said hollow seal portion, comprising a rubber or synthetic resin, and said low density foam sponge material being provided within a portion of said hollow seal portion which is to be held and compressed between said door or a glass and said body panel when said door is closed, wherein said low density foam sponge material has a first portion facing an interior side of the car and a second portion facing an exterior side of the car, and wherein said first portion has a higher density than said second portion, due to being compressed between said door or the glass and said body panel when said door is closed, wherein only said first portion is compressed and said second portion is not compressed, and wherein said low density foam sponge material has a specific gravity of 0.1 to 0.3.

2. The sound insulating weather strip according to claim 1, wherein said low density foam sponge material has a specific gravity smaller than that of said hollow seal portion.

3. The sound insulating weather strip according to claim 1, wherein said low density foam sponge material is extrusion-molded integrally with said hollow seal portion.

* * * * *